(12) United States Patent
Roh

(10) Patent No.: US 7,522,235 B2
(45) Date of Patent: Apr. 21, 2009

(54) SUBSTRATE FOR LIQUID CRYSTAL DISPLAY DEVICE AND METHOD OF FABRICATING THE SAME

(75) Inventor: Su-Dong Roh, Gyeongsangbukdo (KR)

(73) Assignee: LG Display Co., Ltd., Seoul (KR)

( * ) Notice: Subject to any disclaimer, the term of this patent is extended or adjusted under 35 U.S.C. 154(b) by 587 days.

(21) Appl. No.: 11/149,275

(22) Filed: Jun. 10, 2005

(65) Prior Publication Data

US 2006/0055846 A1    Mar. 16, 2006

(30) Foreign Application Priority Data

Sep. 15, 2004    (KR) .................... 10-2004-0073814

(51) Int. Cl.
*G02F 1/1335*    (2006.01)
(52) U.S. Cl. ................. 349/109; 349/106; 349/110
(58) Field of Classification Search ......... 349/106–109, 349/110, 141
See application file for complete search history.

(56) References Cited

U.S. PATENT DOCUMENTS

| | | | |
|---|---|---|---|
| 6,304,384 B1 * | 10/2001 | Nishikawa | 359/619 |
| 7,190,419 B2 * | 3/2007 | Park | 349/43 |
| 2003/0123003 A1 | 7/2003 | Choi et al. | |
| 2004/0125279 A1 | 7/2004 | Lee et al. | |
| 2004/0125301 A1 | 7/2004 | Lee | |

FOREIGN PATENT DOCUMENTS

| | | |
|---|---|---|
| JP | 10-206622 | 8/1998 |
| JP | 10-301101 | 11/1998 |
| JP | 11-052564 | 2/1999 |
| JP | 2001-228314 | 8/2001 |
| JP | 2005-128562 | 5/2005 |
| WO | WO 2005/088360 A1 | 9/2005 |

OTHER PUBLICATIONS

Communication from French Patent Office.

* cited by examiner

*Primary Examiner*—Dung T Nguyen
(74) *Attorney, Agent, or Firm*—McKenna Long & Aldridge LLP

(57) ABSTRACT

A color filter substrate for a liquid crystal display device includes: a substrate having a pixel region; a black matrix on the substrate, the black matrix including a resin and having a curved top surface; and a color filter layer on the black matrix.

9 Claims, 7 Drawing Sheets

SUBSTRATE FOR LIQUID CRYSTAL DISPLAY DEVICE AND METHOD OF FABRICATING THE SAME

The present application claims the benefit of Korean Patent Application No. P2004-0073814 filed in Korea on Sep. 15, 2004, which is hereby incorporated by reference.

BACKGROUND OF THE INVENTION

1. Field of the Invention

The present invention relates to a liquid crystal display device, and more particularly, to a color filter substrate for a liquid crystal display device and a method of fabricating the same.

2. Discussion of the Related Art

In general, a liquid crystal display (LCD) device includes a first substrate and a second substrate that are separated from each other and have a liquid crystal layer interposed therebetween. The first substrate has a common electrode, a black matrix, and a color filter layer, including red, green and blue sub-color filters. The second substrate has a switching element and a pixel electrode.

The black matrix includes a material having an optical density higher than about 3.5. The optical density (OD) is defined by the equation $OD=-Log(T)$, where T is transmittance. For example, a chromium (Cr) thin film or an organic material thin film, including carbon, can be used as the black matrix. In addition, a double layer of chromium and chromium oxide ($Cr/CrO_x$) can be used as the black matrix to reduce reflection from the surface of the double layer.

A photosensitive black resin has been widely used as a black matrix. Since this type of black matrix is formed through coating, exposing and developing steps of the photosensitive black resin, the forming process of this black matrix is simple and fabrication cost is relatively low. A black matrix using a black resin can be used in an in-plane switching mode liquid crystal display (IPS-LCD) device.

FIG. 1 is a schematic cross-sectional view of a substrate for a liquid crystal display device according to the related art. In FIG. 1, a black matrix 5 made of resin is formed on a substrate 3. A color filter layer 7 is formed on the black matrix 5. In general, the black matrix 5 made of resin has an optical density lower than a black matrix made of metallic material. Accordingly, the black matrix 5 made of resin is formed to have a sufficient thickness to prevent light penetration, thereby generating a step in the color filter layer 7. To reduce the effect of the step in the color filter layer 7, an overcoat layer 9 is formed on the color filter layer 7. A common electrode 11 is formed on the overcoat layer 9.

FIGS. 2A to 2E are schematic cross-sectional views showing a fabrication process of a substrate for a liquid crystal display device according to the related art. In FIG. 2A, a black organic layer 13 is formed on a substrate 3 by coating a photosensitive organic material. A mask 15 having a transmissive portion "A" and a blocking portion "B" is disposed over the black organic layer 13. Light is irradiated onto the black organic layer 13 through the mask 15.

In FIG. 2B, a black matrix 5 made of resin is formed on the substrate 3 by developing the irradiated black organic layer 13 (of FIG. 2A). An open portion 10 of the black matrix 5 corresponds to a pixel region. For example, the photosensitive organic material may be a negative type where a non-irradiated potion is removed by developing. In addition, the opening 10 of the black matrix 5 is filled with a color filter layer having red, green and blue sub-color filters.

In FIG. 2C, a red sub-color filter 7a is formed on the black matrix 5 by coating, exposing and developing red resin. Then, a green sub-color filter 7b and a blue sub-color filter 7c are sequentially formed on the black matrix 5 by similar coating, exposing and developing steps. Each sub-color filter 7a, 7b and 7c corresponds to the open portion 10 of the black matrix 5 and overlaps the black matrix 5. Since the black matrix 5 is formed under peripheral portions of each sub-color filter 7a, 7b and 7c, the surface of each sub-color filter 7a, 7b and 7c has a step 20 adjacent to the peripheral portions thereof. For example, each sub-color filter 7a, 7b and 7c may have a step over about 0.8 μm.

In FIG. 2D, an overcoat layer 9 is formed on the color filter layer having red, green and blue sub-color filters 7a, 7b and 7c to reduce the step 20 (of FIG. 2C) of each sub-color filters 7a, 7b and 7c. The overcoat layer 9 includes a transparent insulating resin for planarizing the top surface of the substrate 3.

In FIG. 2E, a common electrode 11 of a transparent conductive material is formed on the overcoat layer 9.

As mentioned above, when a black matrix made of resin is formed on a substrate for an LCD device, a step on a top surface of the substrate is generated due to the thick black matrix. As the surface step increases, the operation of the LCD device becomes unstable. In addition, the surface step causes the appearance of a stain in a displayed image of the LCD device. An overcoat layer is formed to reduce the affects of the step in the surface of the LCD device. However, such an overcoat layer complicates the fabrication process of the LCD device and increases production costs.

SUMMARY OF THE INVENTION

Accordingly, the present invention is directed to a substrate for a liquid crystal display device and a method of fabricating the same that substantially obviate one or more of the problems due to limitations and disadvantages of the related art.

An object of the present invention is to provide a substrate for a liquid crystal display device having an improved display quality without increase in a fabrication process and a production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a color filter substrate for a liquid crystal display device includes: a substrate having a pixel region; a black matrix on the substrate, the black matrix including a resin and having a curved top surface; and a color filter layer on the black matrix.

In another aspect of the present invention, a method of fabricating a color filter substrate for a liquid crystal display device includes: forming a black organic layer on a substrate having a pixel region; exposing and developing the black organic layer to form a flat black matrix having a rectangular shape in a cross-sectional view; treating the flat black matrix to round-off the black matrix to have a curved top surface; and forming a color filter layer on the curved black matrix.

In another aspect of the present invention, a color filter substrate for a liquid crystal display device includes: a substrate having pixel regions; a black matrix about the boundaries of the pixel regions on the substrate, the black matrix including a resin and having a curved top surface; and color filter layers overlapping the curved top surfaces of the black matrix.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
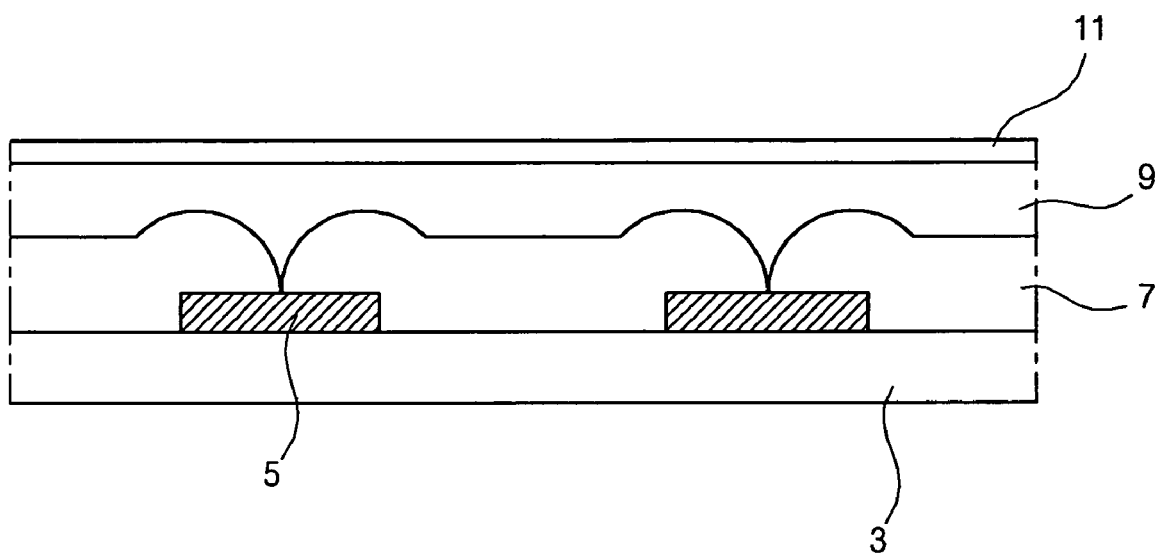
FIG. 1 is a schematic cross-sectional view of a substrate for a liquid crystal display device according to the related art.
Figure 2A:
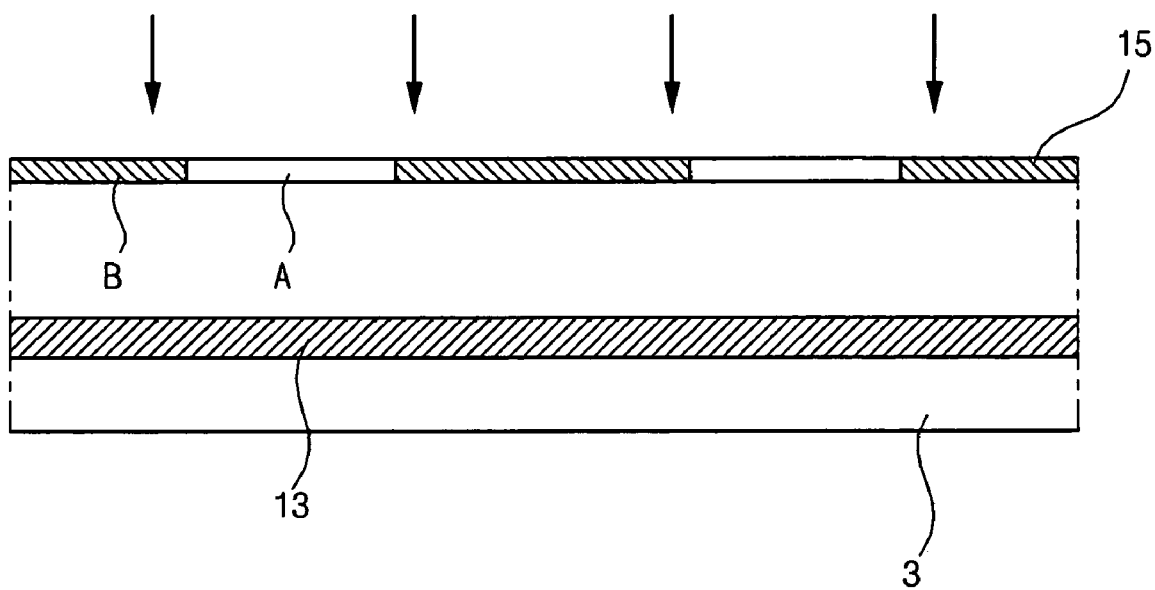
FIGS. 2A to 2E are schematic cross-sectional views showing a fabrication process of a substrate for a liquid crystal display device according to the related art.
Figure 2B:
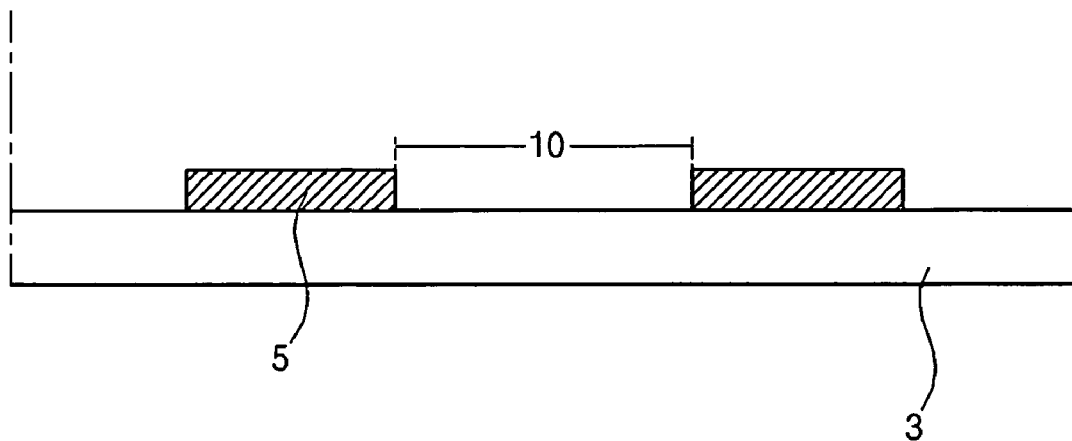
Figure 2C:
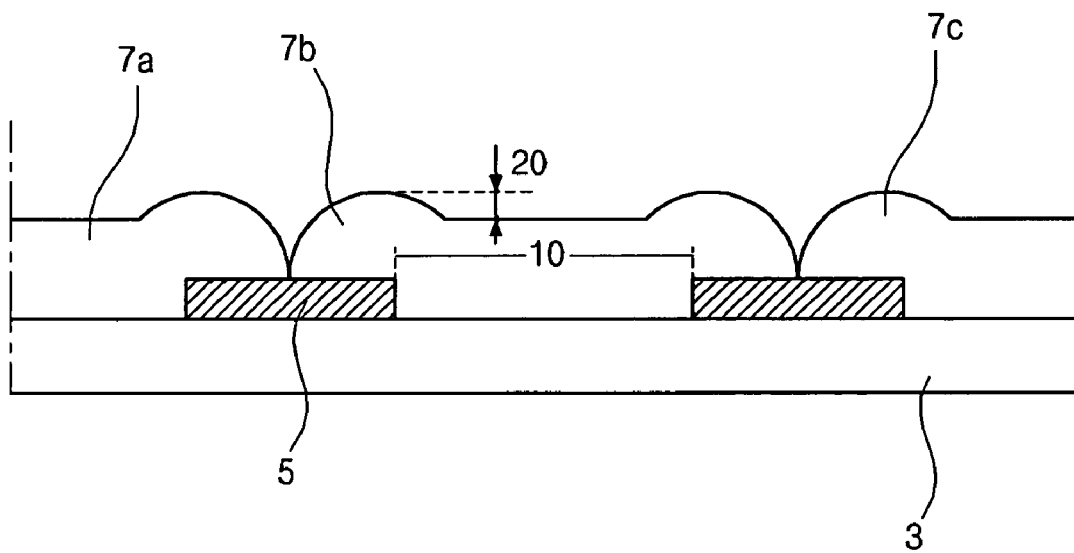
Figure 2D:
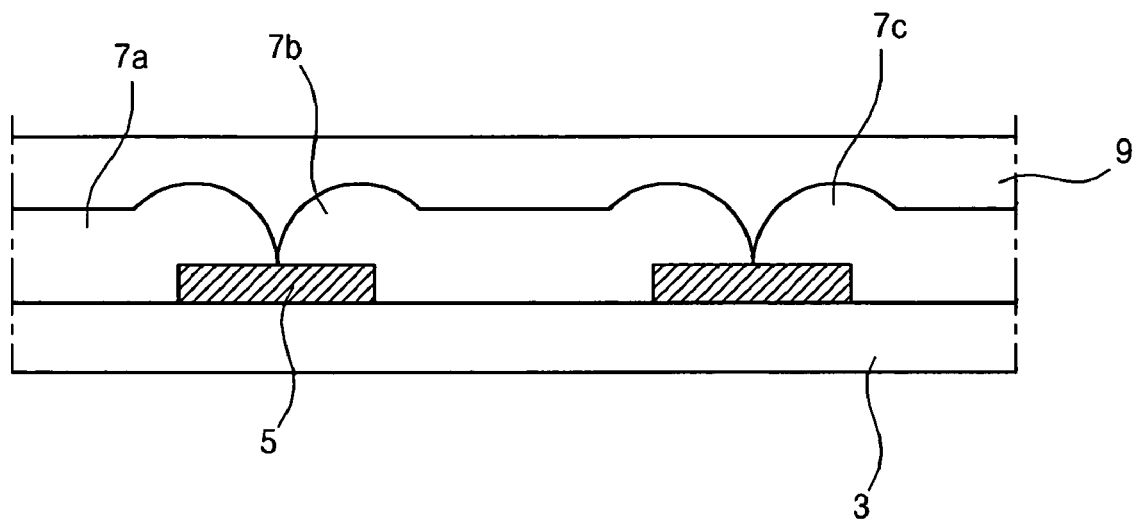
Figure 2E:
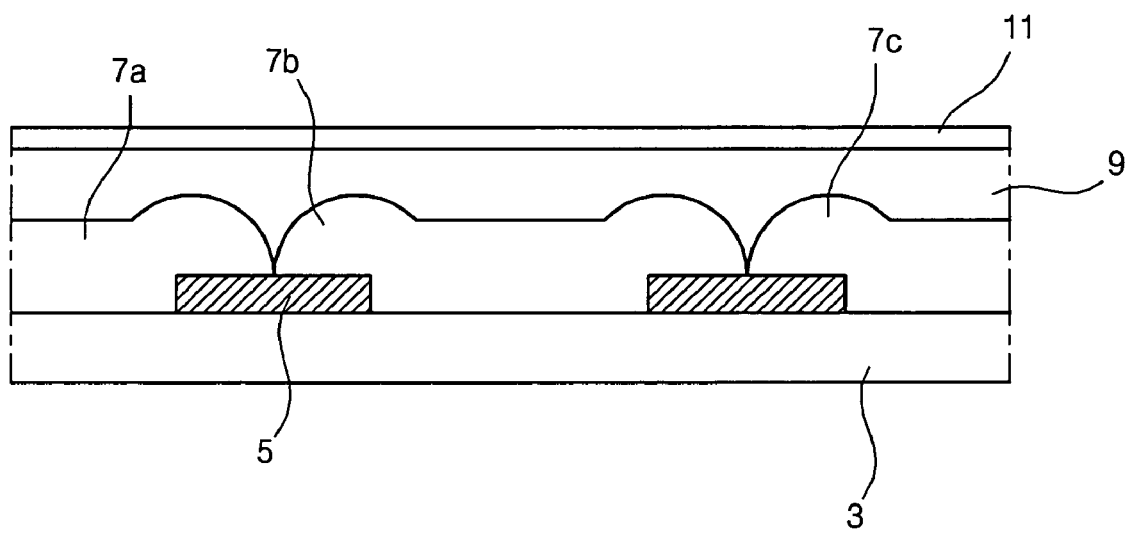
Figure 3:
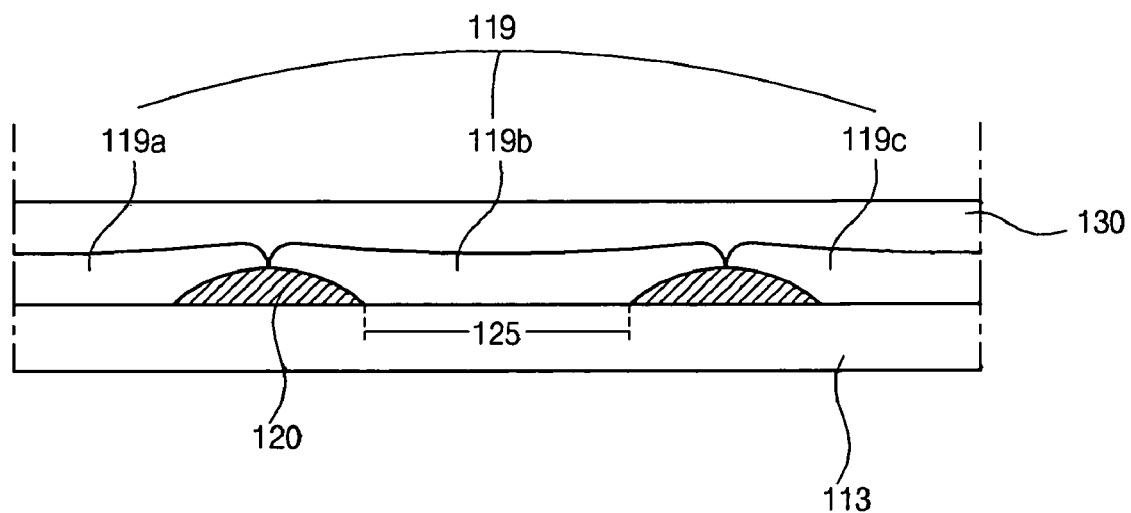
FIG. 3 is a schematic cross-sectional view of a substrate for a liquid crystal display device according to an exemplary embodiment of the present invention.

FIG. 3 is a schematic cross-sectional view of a substrate for a liquid crystal display device according to an exemplary embodiment of the present invention. As shown in FIG. 3, a black matrix 120 made of resin is formed about the boundaries of the pixel regions on a substrate 113. The upper surface of the black matrix 120 has a curved shape to substantially relieve a step in the subsequent color filter layer 119. Then, a color filter layer 119 is formed on the curved matrix 120. A common electrode 130 is formed on the color filter layer 119. Since the curved shape of the black matrix 120 relieves a step of the color filter layer 119, the common electrode 130 is directly formed on the color filter layer 119 without an additional overcoat layer.

FIGS. 4A to 4E are schematic cross-sectional views showing a fabrication process of a substrate for a liquid crystal display device according to an exemplary embodiment of the present invention.

Figure 4A:
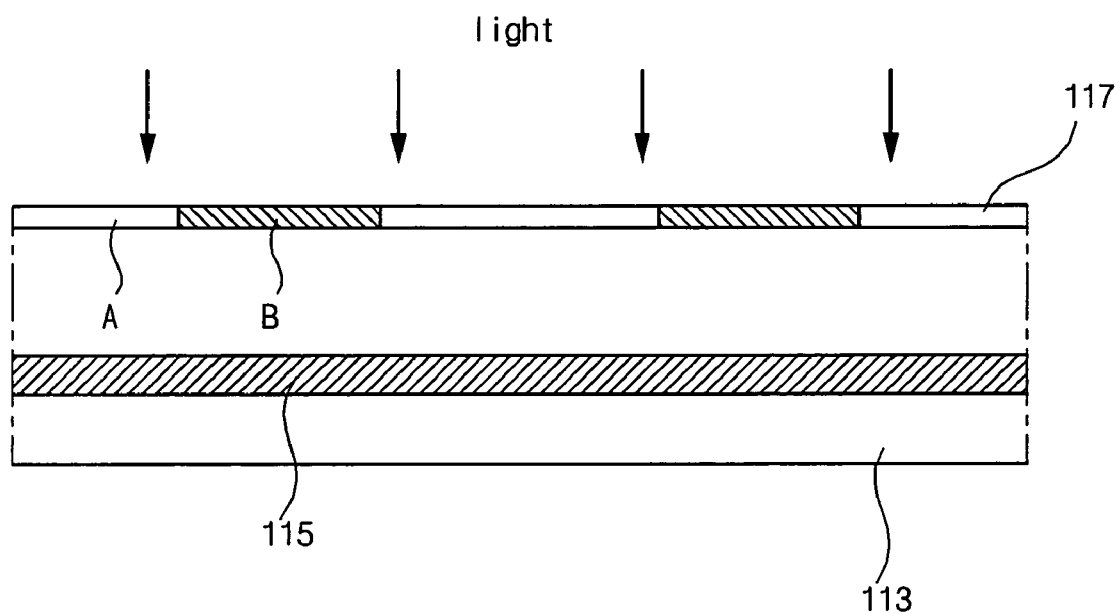
FIGS. 4A to 4E are schematic cross-sectional views showing a fabrication process of a substrate for a liquid crystal display device according to an exemplary embodiment of the present invention.

As shown in FIG. 4A, a photosensitive organic material is coated onto the substrate 113 to form a black organic layer 115. A mask 117 having a transmissive portion "A" and a blocking portion "B" is disposed over the black organic layer 115. The photosensitive organic material may be classified into one of two types of photosensitive material: a positive type and a negative type. An irradiated portion of a positive type photosensitive organic material is removed by development, while a non-irradiated portion of a negative type photosensitive organic material is removed by development. For convenience of illustration, a positive type photosensitive organic material is used for the black organic layer 115. After forming the black organic layer 115, light is irradiated onto the black organic layer 115 through the mask 117.

Figure 4B:
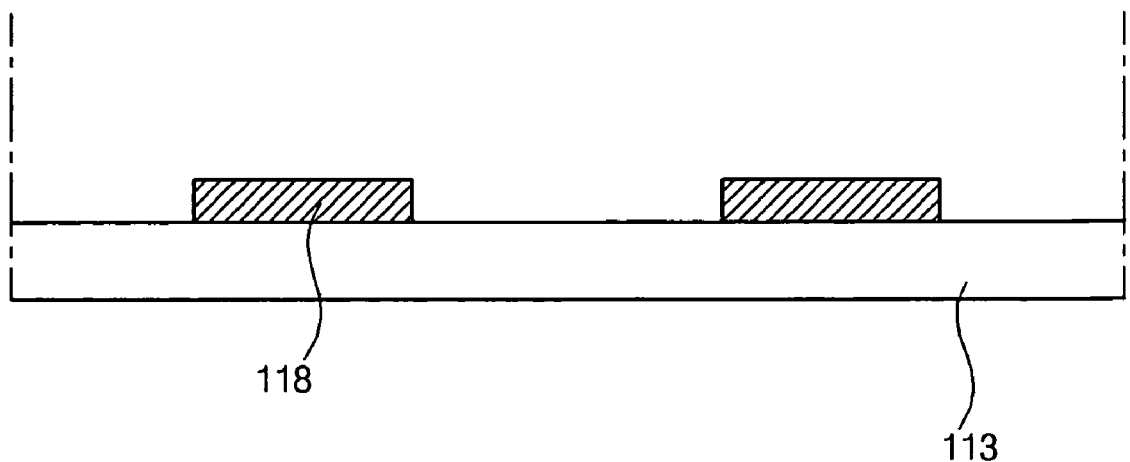

As shown in FIG. 4B, a flat black matrix 118 made of resin is formed on the substrate 113 through developing the irradiated black organic layer 115 (of FIG. 4A). The flat black matrix 118 has a flat top surface and steep sides. Accordingly, the flat black matrix 118 has a rectangular shape in a cross-sectional view. Since a positive type photosensitive organic material is used for the flat black matrix 118, the flat black matrix 118 corresponds to the blocking portion "B" of the mask 117 (of FIG. 4A). Further, the flat black matrix 118 includes openings for receiving a color filter layer having red, green and blue sub-color filters in a subsequent process. The openings of the flat black matrix 118 correspond to pixel regions used for displaying images. In addition, the flat black matrix 118 may be formed to cover a thin film transistor on another substrate. Since incident light to the thin film transistor is shielded by the flat black matrix 118, leakage current in the thin film transistor is prevented.

Figure 4C:
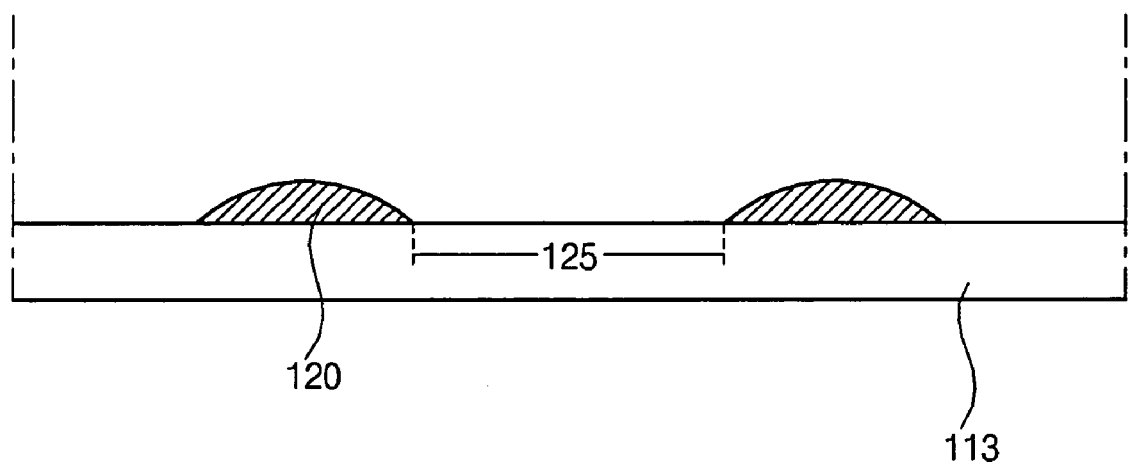

As shown in FIG. 4C, the flat black matrix 118 is treated with heat to reshape the rectangular-shaped black matrix 118 into a curved black matrix 120. For example, the flat black matrix 118 may be annealed under a temperature of about 220° C. for a time period of about 30 minutes to about an hour. The viscosity of the resin for the flat black matrix 118 is decreased by the heat. Thus, a peripheral portion of the resin flows out, thereby obtaining the curved black matrix 120. A top surface of the curved black matrix 120 is not flat but rounded off to reduce a step of a subsequent color filter layer. The curved black matrix 120 has openings 125 corresponding to the pixel regions.

Figure 4D:
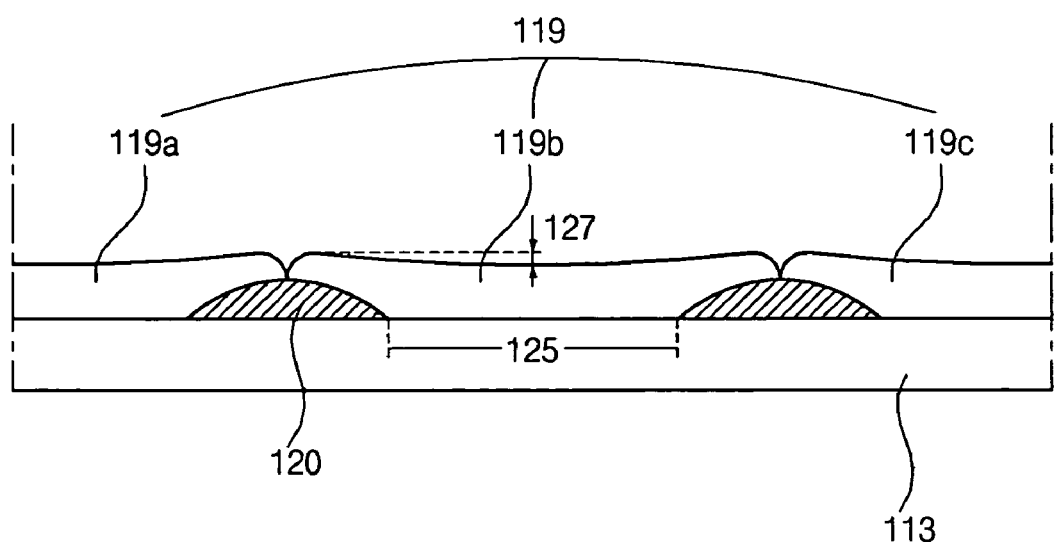

As shown in FIG. 4D, a red sub-color filter 119a is formed on the curved black matrix 120 by coating, exposing and developing red resin. Then, a green sub-color filter 119b and a blue sub-color filter 119c are sequentially formed on the curved black matrix 120 by similar coating, exposing and developing steps. Each sub-color filter 119a, 119b and 119c corresponds to openings 125 of the curved black matrix 120 and overlaps the curved black matrix 120. Even though the color filter layer 119 has a step 127 between a first top surface directly over the curved black matrix 120 and a second top surface directly over the substrate 113 exposed through the openings 125 resulting from the underlying curved black matrix 120 at peripheral portions of the color filter, the step 127 of the color filter layer 119 is substantially relieved because of the rounded-off shape of the curved black matrix 120. For example, the color filter layer 119 can have a height difference between a first top surface of the color filter layer over the black matrix 120 and a second top surface the color filter layer over the opening in the black matrix. The height difference can be less than about 0.8 μm.

Figure 4E:
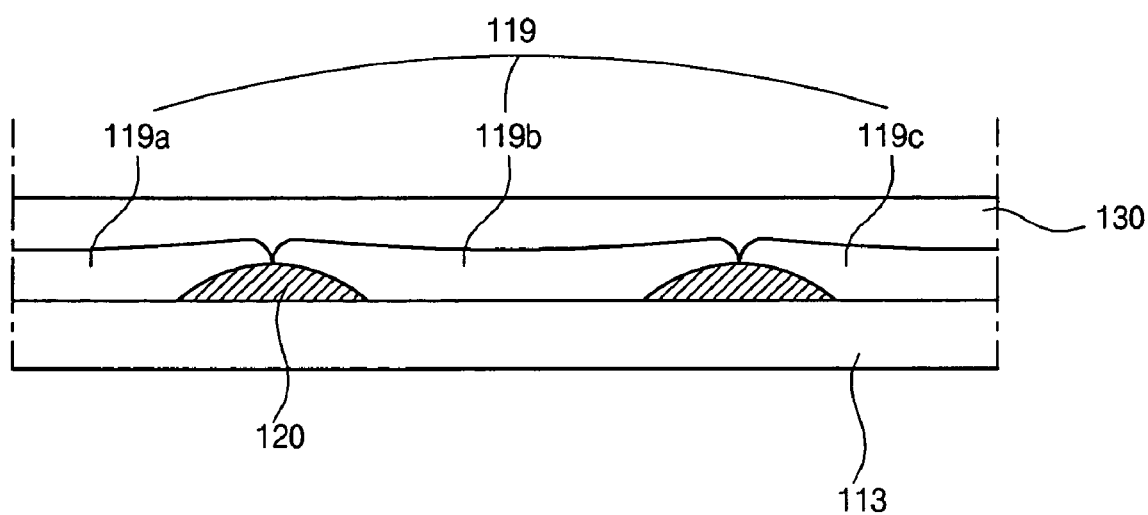

As shown in FIG. 4E, a common electrode 130 of a transparent conductive material is formed on the color filter layer 119. Since the step of the color filter layer 119 is reduced due to the curved black matrix 120, the common electrode 130 is formed directly on the color filter layer 119 without an additional layer for planarization purposes. The common electrode 130 may include one of indium-tin-oxide (ITO) and indium-zinc-oxide (IZO). The common electrode 130 drives liquid crystal molecules with a pixel electrode on the other substrate.

When the LCD device is an in-plane switching mode type, a common electrode is formed on the other substrate with a pixel electrode. Accordingly, common electrode 130 on the color filter layer 119 is not required in an in-plane switching mode type LCD device.

Since the flat black matrix made of resin is heated to round-off a black matrix made of resin to have a curved top surface, the color filter layer on the curved black matrix has a step less than about 0.8 μm. Accordingly, the common electrode is formed directly on the color filter layer without an additional overcoat layer for planarization. As a result, subsequent fabrication processes are simplified and production cost is reduced. Although exemplary embodiments have been explained with regard to a liquid crystal display device, the present invention can be used in other types of display devices. The present invention can be applied to a projector that uses an LCD, such as projection TV or presentation projector.

It will be apparent to those skilled in the art that various modifications and variations can be made in the substrate for the liquid crystal display device and the method of fabricating the same of the present invention without departing from the sprit or scope of the invention. Thus, it is intended that the present invention covers the modifications and variations of this invention provided they come within the scope of the appended claims and their equivalents.

What is claimed is:

1. A color filter substrate for a display device, comprising:
   a substrate having a pixel region;
   a black matrix on the substrate, the black matrix including a resin and having a curved top surface; and
   a color filter layer on the black matrix,
   wherein the black matrix has an opening corresponding to the pixel region, and the color filter layer has a height difference between a first top surface of the color filter layer over the black matrix and a second top surface of the color filter layer over the opening, and the height difference is less than about 0.8 μm.

2. The substrate according to claim 1, wherein the resin includes a photosensitive organic material.

3. The substrate according to claim 1, wherein the photosensitive organic material is a positive type such that an irradiated portion is removed by photolithography.

4. The substrate according to claim 1, wherein the display device is a liquid crystal display device.

5. The substrate according to claim 4, further comprising a common electrode on the color filter layer.

6. The substrate according to claim 4, wherein the display device is an in-plane switching mode liquid crystal display device.

7. A color filter substrate for a liquid crystal display device, comprising:
   a substrate having pixel regions;
   a black matrix about the boundaries of the pixel regions on the substrate, the black matrix including a resin and having a curved top surface; and
   color filter layers overlapping the curved top surfaces of the black matrix,
   wherein the black matrix has an opening corresponding to the pixel region, and the color filter layer has a height difference between a first top surface of the color filter layer over the black matrix and a second top surface of the color filter layer over an opening in the black matrix, and the height difference is less than about 0.8 μm.

8. The substrate according to claim 7, further comprising a common electrode directly on the color filter layer.

9. The substrate according to claim 7, wherein the liquid crystal display device is an in-plane switching mode liquid crystal display device.

* * * * *